US010282500B1

(12) United States Patent
Van et al.

(10) Patent No.: US 10,282,500 B1
(45) Date of Patent: May 7, 2019

(54) EFFICIENT MODELING OF ELECTROMAGNETIC PROPERTIES OF AN ASSEMBLY

(71) Applicants: Tri Van, Stanton, CA (US); George Antilla, Redondo Beach, CA (US); Owen Cupp, Fullerton, CA (US)

(72) Inventors: Tri Van, Stanton, CA (US); George Antilla, Redondo Beach, CA (US); Owen Cupp, Fullerton, CA (US)

(73) Assignees: NORTHROP GRUMMAN SYSTEMS CORPORATION, Falls Church, VA (US); APPLIED RESEARCH ASSOCIATES, INC., Dayton, OH (US)

( * ) Notice: Subject to any disclaimer, the term of this patent is extended or adjusted under 35 U.S.C. 154(b) by 0 days.

(21) Appl. No.: 15/295,532

(22) Filed: Oct. 17, 2016

(51) Int. Cl.
*G06F 17/50* (2006.01)

(52) U.S. Cl.
CPC ...... *G06F 17/5018* (2013.01); *G06F 2217/16* (2013.01)

(58) Field of Classification Search
None
See application file for complete search history.

(56) References Cited

U.S. PATENT DOCUMENTS

| | | | | |
|---|---|---|---|---|
| 8,938,372 | B1 * | 1/2015 | Petersson | H04B 3/00 703/2 |
| 2008/0065361 | A1 * | 3/2008 | Canning | G06F 17/5009 703/2 |
| 2009/0132187 | A1 * | 5/2009 | Shaeffer | G06F 17/50 702/64 |
| 2014/0236551 | A1 * | 8/2014 | Vold | G06F 17/5018 703/2 |

OTHER PUBLICATIONS

Tyrtyshnikov, "Incomplete Cross Approximation in the Mosaic-Skeleton Method", Computing, vol. 64, Issue 4, Jun. 2000, pp. 367-380.*
Tyrtyshnikov, Eugene. "Incomplete cross approximation in the mosaic-skeleton method." Computing 64.4 (2000): 367-380. (Year: 2000).*
Andriulli, et al. "*Hierarchical bases for nonhierarchic 3-D triangular meshes.*" IEEE Transactions on Antennas and Propagation 56.8 (2008): 2288-2297.
Matekovits, et al. "*Analysis of a 3D antenna array by the Synthetic-Function eXpansion method.*" 15. RiNEm (2004): 1000-1004.
Terzo, et al., *Grid Infrastructure for Domain Decomposition Methods in Computational ElectroMagnetics* Soha Maad (Ed.), 2012.

* cited by examiner

*Primary Examiner* — Omar F Fernandez Rivas
*Assistant Examiner* — Bijan Mapar
(74) *Attorney, Agent, or Firm* — Tarolli, Sundheim, Covell & Tummino LLP

(57) ABSTRACT

Systems and methods are provided for modeling electromagnetic properties of an assembly. The system includes a modeling component configured to divide the assembly into a plurality of subdomains, with each subdomain representing a three-dimensional volume of the assembly, and determine a set of standard elemental basis functions for each subdomain, such that a linear combination of elemental basis functions represents the electromagnetic properties of a portion of the geometry of the subdomain. A synthetic function generator is configured to generate a set of synthetic "entire-domain" basis functions for each subdomain from its set of elemental basis functions. A response characterization component is configured to determine the electromagnetic properties of the assembly from the sets of synthetic basis functions for each subdomain and an excitation matrix representing simulated incident electrical and magnetic stimulation to the assembly.

18 Claims, 2 Drawing Sheets

EFFICIENT MODELING OF ELECTROMAGNETIC PROPERTIES OF AN ASSEMBLY

GOVERNMENT INTEREST

This invention was made with Government support. The Government has certain rights in this invention.

TECHNICAL FIELD

This invention relates to computational electromagnetics, and more particularly, to modeling of electromagnetic properties of an assembly.

BACKGROUND

The accurate and efficient solution of Maxwell's equations is the problem addressed by the scientific discipline called computational electromagnetics. Many macroscopic phenomena in a great number of fields are governed by this set of differential equations, including electronic, geophysics, medical and biomedical technologies, virtual EM prototyping, and antenna and propagation applications. Many of these applications aim to simulate the electromagnetic behavior of objects, for example in terms of input impedance and radiation pattern in antenna problems, or in terms of radar cross section for scattering applications.

SUMMARY OF THE INVENTION

In accordance with an aspect of the present invention, a system based on the Finite Element and Boundary Integral Equation (FE-BI) method is provided for modeling electromagnetic properties of an assembly. The system includes at least one processor and a non-transitory computer readable medium storing instructions that are executable by the at least one processor to determine electromagnetic properties of the assembly. The executable instructions include a modeling component configured to divide the assembly into a plurality of subdomains, with each subdomain representing a three-dimensional volume of the assembly, and determine a set of standard elemental basis functions for each subdomain, such that a linear combination of elemental basis functions represents the electromagnetic properties of a portion of the geometry of the subdomain. A synthetic function generator is configured to generate a set of synthetic "entire-domain" basis functions for each subdomain from its set of elemental basis functions. A response characterization component is configured to determine the electromagnetic properties of the assembly from the sets of synthetic basis functions for each subdomain and an excitation matrix representing simulated incident electrical and magnetic stimulation to the assembly.

In accordance with another aspect of the present invention, a method is provided for modeling electromagnetic properties of an assembly. The assembly is divided into a plurality of subdomains, with each subdomain representing a three-dimensional volume of the assembly. A set of elemental basis functions is determined for each subdomain such that a linear combination of elemental basis functions represents the electromagnetic properties of a portion of the geometry of the subdomain. A set of synthetic basis functions is determined for each subdomain from its set of basis functions. The electromagnetic properties of the assembly are determined from the sets of synthetic basis functions for each subdomain and an excitation matrix representing simulated incident electrical and magnetic stimulation to the assembly.

In accordance with yet another aspect of the present invention, a method is provided for modeling electromagnetic properties of an assembly. The geometry of the assembly is divided into a plurality of subdomains. An impedance matrix is determined for each subdomain. A matrix of surface unknowns representing the surface current densities and/or aperture fields is determined from the impedance matrix for each subdomain representing a response of the portion of the geometry of the subdomain to each of a broad spectrum of electromagnetic excitations. A set of synthetic basis functions is determined for each subdomain as a change of basis matrix from the determined matrix of surface unknowns for the subdomain. A reduced impedance matrix is produced for the assembly from the determined sets of synthetic basis functions for each subdomain and the determined impedance matrices for each subdomain. The surface unknowns are calculated for an excitation of interest from the reduced impedance matrix.

DETAILED DESCRIPTION

Figure 1:
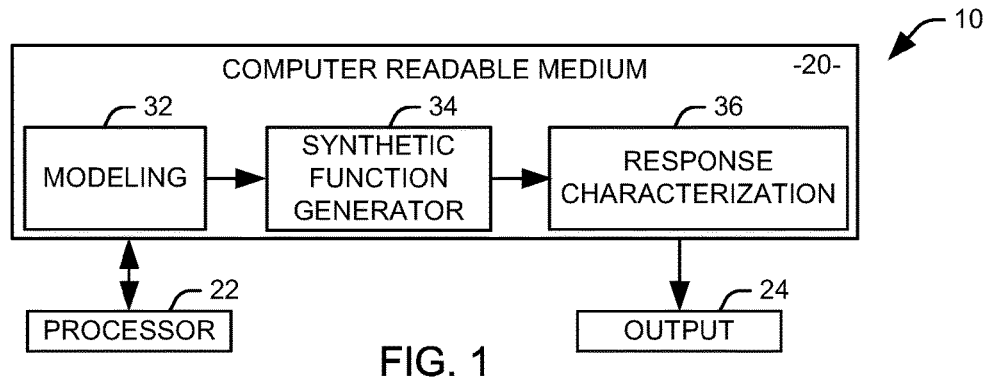
FIG. 1 illustrates one example of system for modeling electromagnetic properties of an assembly.

FIG. 1 illustrates one example of system 10 for modeling electromagnetic properties of an assembly. The system 10 utilizes a domain decomposition approach, and thus the assembly is represented as a plurality of subdomains, with the modeling performed as smaller boundary value problems at each subdomain. The system 10 includes at least one processor 22 and a non-transitory computer readable medium 20 storing instructions executable by at least one processor 22 associated with the processing unit 204 illustrated in FIG. 4. It will be appreciated that the computer readable medium 20 can comprise a single medium or multiple computer readable media (not shown) each operatively connected to one or more of the at least one processor 22. Further, it will be appreciated that the depiction of each functional component 32, 34, and 36 stored on the computer readable medium 20 can represent multiple instances of the functional component. In one implementation, a plurality of processors is utilized, with each processor executing an instance of at least the modeling component 32 and the synthetic function generator 34.

The executable instructions include a modeling component 32 configured to determine a set of elemental basis functions for each of a plurality of subdomains, such that a linear combination of basis functions represents a surface unknowns, such as current densities or aperture fields, on the geometry of the subdomain. In one implementation, determining the set of elemental basis functions includes determining an impedance matrix within the subdomain. In one implementation, to facilitate analysis of larger subdomains in which interaction among the various well-separated edges is weak and the resulting impedance matrix would be numerically low rank, a hierarchical matrix approach to compress the impedance matrix. For example, an adaptive cross-approximation algorithm can be utilized iteratively to add rows and columns to the impedance matrix until the sum of the values added to the matrix with the addition of a new row or column is a less than a threshold value.

The set of elemental basis functions can be determined from the set of elemental basis functions. In the example of modeling response to electromagnetic excitation, the set of elemental basis functions, or rather a linear combination of the elemental basis functions, can represent unknown quantities to be solved such as surface currents and aperture fields on the assembly in response to a modeled electromagnetic excitation. In practice, the modeled excitation can be selected to include a broad range of excitations, such that excitations other than an excitation of interest are modeled. For example, in one implementation, far field excitations, near field excitations, and current flow with adjacent subdomains can all be represented in a matrix representing the modeled excitation, allowing for the creation of an overdetermined solution space.

A synthetic function generator 34 is configured to generate a set of synthetic basis functions for each subdomain from its set of elemental basis functions. For example, one of an eigendecomposition and a singular value decomposition can be applied to the set of elemental basis functions to provide the synthetic basis functions. In one example, the set of synthetic basis functions can be represented as a change of basis matrix that can be applied to the elemental basis functions to produce the synthetic basis functions.

A response characterization component 36 is configured to determine electromagnetic properties of the assembly from the set of synthetic basis functions and an excitation matrix, representing an electrical and magnetic stimulation to the assembly that is of interest for a particular modeling application. In one example, the set of synthetic basis functions can be used to directly solve for the electromagnetic properties in a domain associated with the set of synthetic basis functions, and the resulting solution can be transformed back into a standard solution space. In another example, an iterative process, such as an iterative linear solver algorithm, can be used to solve for the electromagnetic properties. The determined properties can then be provided to a user at an associated output device 24, such as a printer or a display.

Figure 3:
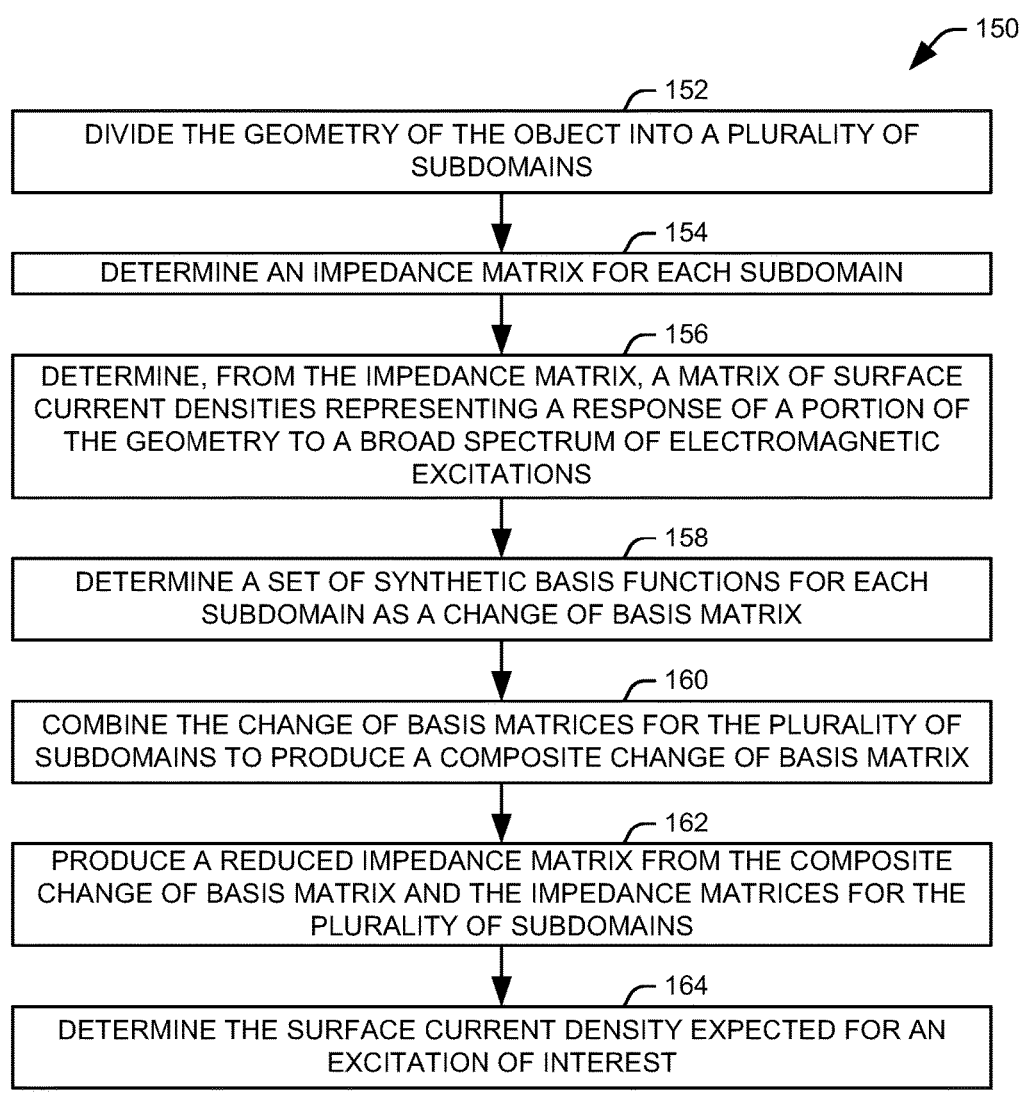
FIG. 3 illustrates a method for modeling a response of an object to electromagnetic excitation.
Figure 2:
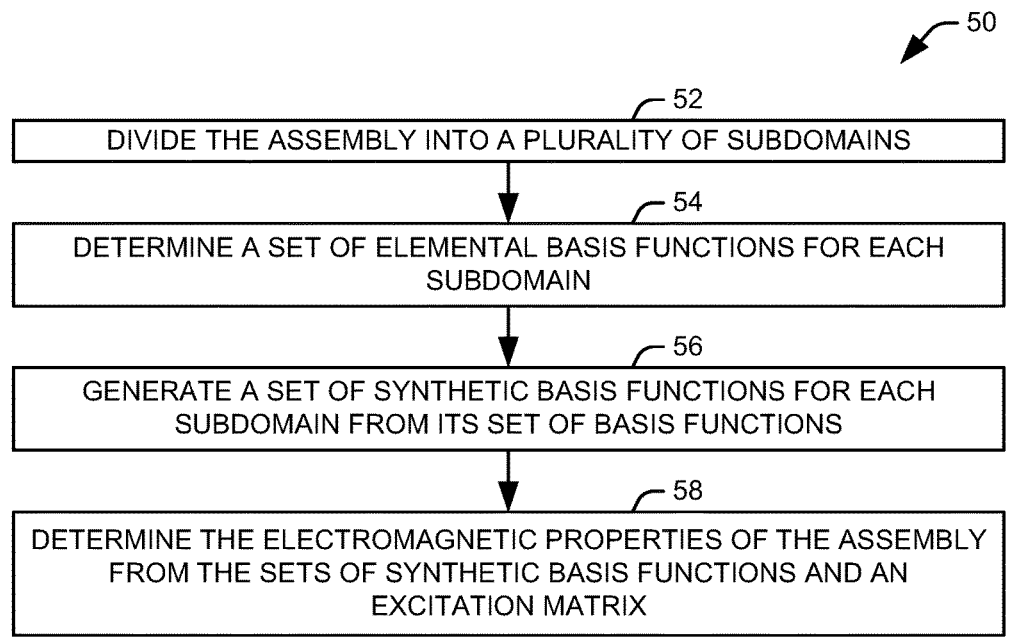
FIG. 2 illustrates one example of a method for modeling electromagnetic properties of an assembly.

In view of the foregoing structural and functional features described above in FIG. 1, example methods will be better appreciated with reference to FIGS. 2 and 3. While, for purposes of simplicity of explanation, the methods of FIGS. 2 and 3 are shown and described as executing serially, it is to be understood and appreciated that the present invention is not limited by the illustrated order, as some actions could in other examples occur in different orders and/or concurrently from that shown and described herein.

FIG. 2 illustrates one example of a method 50 for modeling electromagnetic properties of an assembly. At 52, the assembly is divided into a plurality of subdomains, with each subdomain representing a three-dimensional volume of the assembly. At 54, a set of elemental basis functions are determined for each subdomain such that a linear combination of elemental basis functions represents the electromagnetic properties of a portion of the geometry of the subdomain. In one implementation, an impedance matrix is generated from the geometry and electrical properties of the subdomain, representing an electrical property for each of a plurality of discrete elements, and the set of elemental basis functions are determined from the impedance matrix and a set of simulated excitations. The set of simulated excitations can represent a broad range of excitations, such that excitations other than an excitation of interest are represented. In one implementation, the impedance matrix is determined for each subdomain utilizing an adaptive cross-approximation algorithm that iteratively adds rows and columns to a matrix representing the impedance matrix until the sum of the values added to the matrix with the addition of a new row or column is a less than a threshold value.

At 56, a set of synthetic basis functions is generated for each subdomain from its set of basis functions. In one implementation, an eigendecomposition is applied to the set of elemental basis functions to provide the synthetic basis functions. In another implementation, a singular value decomposition is applied to the set of elemental basis functions to provide the synthetic basis functions. At 58, electromagnetic properties of the assembly are determined from the sets of synthetic basis functions for each subdomain and an excitation matrix, representing simulated incident electrical and magnetic stimulation to the assembly. It will be appreciated that the response to the excitation can be determined either directly or iteratively, from a desired excitation and the synthetic basis functions. In one example, a set of surface current densities, J, can be determined from a reduced impedance matrix, Z', generated from an impedance matrix and the synthetic basis functions, and an excitation of interest, E, from the relationship ZJ=E.

FIG. 3 illustrates one example of a method 150 for modeling a response of an object to electromagnetic excitation. At 152, the geometry of the object is divided into a plurality of subdomains. In one implementation, each subdomain comprises a plurality of edges over a three-dimensional volume. At 154, an impedance matrix is determined for each subdomain. In one implementation, the impedance matrix can be determined via a hierarchical matrix approach. In practice, the impedance matrix for a given domain can be numerically low rank and sufficiently large to be cumbersome to calculate directly. Accordingly, the matrix is estimated by a series of local, low-rank submatrices, representing smaller clusters of edges within the subdomain. In one example, an adaptive cross-approximation algorithm can be utilized iteratively add rows and columns to the impedance matrix until the sum of the values added to the matrix with the addition of a new row or column is a less than a threshold value.

At 156, the impedance matrix, Z, for each subdomain is used to determine a matrix of surface current densities, J, representing a response of the portion of the geometry to a broad spectrum of electromagnetic excitations, represented as an excitation matrix, E. Specifically, for each subdomain, the surface current matrix J is determined from the relationship ZJ=E, either by solving directly for J or by applying an iterative numerical method to approximate J.

At 158, a set of synthetic basis functions are determined for each subdomain as a change of basis matrix. To this end, an appropriate decomposition algorithm can be applied to the matrix of surface current densities for each subdomain to produce a set of synthetic basis functions for the subdomain. In one implementation, this is accomplished via an eigendecomposition process. Alternatively, a singular value decomposition can be utilized to obtain the synthetic basis functions. Once a set of synthetic basis functions has been determined for each subdomain, the change of basis matrices representing the various sets of synthetic basis functions can be combined to produce a composite change of basis matrix for the object at 160. In the composite change of basis matrix, edges between the various subdomains can be represented by a set of standard Rao-Wilton-Glisson (RWG) basis functions.

At 162, a reduced impedance matrix is produced from the composite change of basis matrix, U, and the impedance matrices for the plurality of subdomains. Specifically, the reduced impedance matrix, Z, can be calculated as:

$$Z'=U'^{-1}ZU'$$ Eq. 1 where Z is the impedance matrix and the change of basis matrix, U', is unitary, such that $U'^{-1}=U'^{H}$, where H denotes the conjugate transpose.

In one example, the reduced impedance matrix can be built via operations on the individual impedance matrices associated with the subdomains, allowing this calculation to be performed in parallel. In this implementation, each subdomain impedance matrix can be represented as one block, $Z_{ij}$, of the impedance matrix, Z, and a corresponding portion of the change of basis matrix, U', can be utilized to build a corresponding block, $Z_{ij}'$ of the reduced impedance matrix.

At 164, the surface current density, J, expected for an excitation of interest, E, is calculated. In one implementation, the current density can be solved for directly using the reduced impedance matrix. Using the reduced impedance matrix, Z', the direct solution can be determined, as:

$$ZJ=E \rightarrow ZU'U'^{H}J=E \rightarrow (U'^{H}ZU')U'^{H}J=U'^{H}E \rightarrow J=U'Z'^{-1}(U'^{H}E)$$ Eq. 2

In another implementation, the surface current density is determined iteratively. Specifically, the relationship $Z'(U'^{H}J)=U'^{H}E$ is solved iteratively for $U'^{H}J$, and the determined solution can be multiplied by U' to obtain the current densities.

Figure 4:
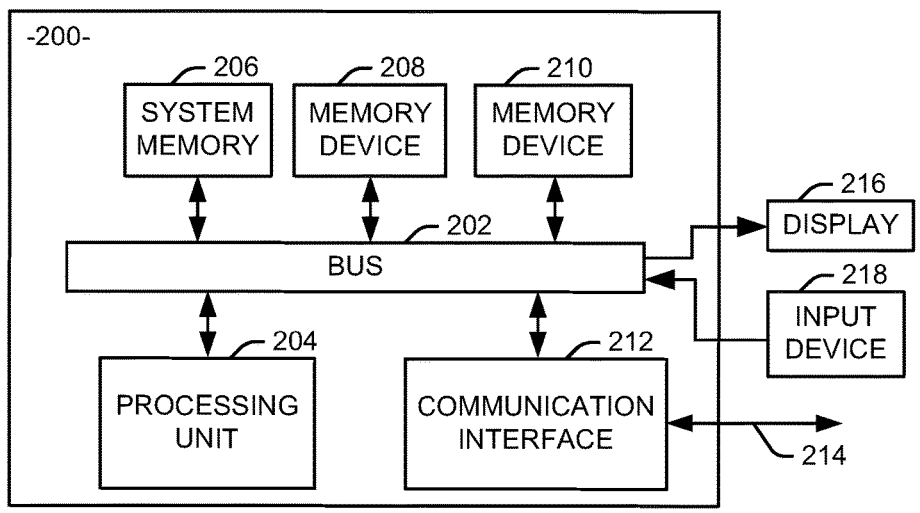
FIG. 4 is a schematic block diagram illustrating an exemplary system of hardware components capable of implementing examples of the systems and methods.

FIG. 4 is a schematic block diagram illustrating an exemplary system 200 of hardware components capable of implementing examples of the systems and methods disclosed in FIGS. 1-3. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a modeling system in accordance with the present invention. Computer executable logic for implementing the diagnostic system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can, in practice, refer to multiple, operatively connected apparatuses for storing machine executable instructions.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system for modeling a radar cross section of a conductive assembly, the system comprising:
   at least one processor; and
   a non-transitory computer readable medium storing instructions, executable by the at least one processor, for determining the radar cross section of the assembly, the executable instructions comprising:
   a modeling component configured to divide the assembly into a plurality of subdomains, each subdomain representing a three-dimensional volume of the assembly, determine a set of elemental basis functions for each subdomain, such that a linear combination of the set of elemental basis functions represents electromagnetic properties of a portion of a geometry of the subdomain, generate an impedance matrix from the geometry of the subdomain, representing a plurality of discrete elements within the subdomain, and compress the generated impedance matrix via an adaptive cross-approximation algorithm that iteratively adds rows and columns to a matrix representing the impedance matrix until the sum of the values added to the matrix with the addition of a new row or column is a less than a threshold value;
   a synthetic function generator configured to generate a set of synthetic basis functions for each subdomain from its set of elemental basis functions; and
   a response characterization component configured to determine the radar cross section of the assembly from the sets of synthetic basis functions for each subdomain and an excitation matrix representing simulated incident electrical and magnetic stimulation to the assembly.

2. The system of claim 1, wherein the synthetic function generator is configured to apply an eigendecomposition to the set of elemental basis functions for the subdomain to generate the set of synthetic basis functions.

3. The system of claim 1, wherein the synthetic function generator is configured to apply a singular value decomposition (SVD) to the set of elemental basis functions for the subdomain to generate the set of synthetic basis functions.

4. The system of claim 1, wherein the synthetic function generator is configured to generate the set of synthetic basis functions for each subdomain to be used as a change of basis matrix determined for transforming a portion of the impedance matrix for the subdomain into a reduced matrix representing the subdomain.

5. The system of claim 1, wherein the synthetic function generator is configured to generate the set of synthetic basis functions by determining surface unknowns representing at least one of surface currents and aperture fields within the subdomain from the impedance matrix and a modeled excitation can be selected to include a broad range of excitations.

6. The system of claim 4, wherein the response characterization component is configured to determine a matrix, J, representing surface unknowns comprising at least one of current densities and aperture fields at each of the plurality of discrete elements, from a combined impedance matrix, Z, representing the plurality of subdomains, and the excitation matrix, E.

7. The system of claim 6, wherein the response characterization component is configured to determine the matrix representing current density at each of the plurality of discrete elements by applying the change of basis matrix to the combined impedance matrix to provide a reduced matrix, Z', evaluating the relationship Z'J'=E to provide a matrix, J', representing the surface unknowns in a domain associated with the change of basis matrix, and applying a conjugate transpose of the change of basis matrix to the matrix representing the surface unknowns in a domain associated with the change of basis matrix to provide the matrix representing current density.

8. The system of claim 7, wherein the response characterization component is configured to evaluating the relationship Z'J'=E using an iterative linear solver.

9. The system of claim 7, wherein the response characterization component is configured to directly calculate J' using the relationship Z'J'=E.

10. The system of claim 1, wherein the at least one processor comprises a plurality of processors, and each processor executes an instance of the synthetic function generator to generate a set of synthetic basis functions for an associated one of the plurality of subdomains.

11. A system for modeling electromagnetic properties of a conductive assembly, the system comprising:
a plurality of processing units; and
a non-transitory computer readable medium storing instructions, executable by the plurality of processing units, for determining the electromagnetic properties of the conductive assembly, the executable instructions comprising:
a modeling component configured to divide the conductive assembly into a plurality of subdomains, each subdomain representing a plurality of edges over a three-dimensional volume of the conductive assembly, determine a impedance matrix for each subdomain, and compress the determined impedance matrix via an adaptive cross-approximation algorithm that iteratively adds rows and columns to a matrix representing the impedance matrix until the sum of the values added to the matrix with the addition of a new row or column is a less than a threshold value to provide a compressed impedance matrix;
a plurality of instances of a synthetic function generator, each configured to generate a set of synthetic basis functions for a given subdomain from its compressed impedance matrix, wherein a plural subset of the plurality of instances of the synthetic function generator are executed in parallel on the plurality of processing units; and
a response characterization component configured to determine the electromagnetic properties of the conductive assembly from the sets of synthetic basis functions for each subdomain and an excitation matrix representing simulated incident electrical and magnetic stimulation to the conductive assembly.

12. The system of claim 11, wherein each instance of the synthetic function generator is configured to generate the set of synthetic basis functions by determining surface unknowns representing at least one of surface currents and aperture fields within the subdomain from the impedance matrix and a modeled excitation can be selected to include a broad range of excitations.

13. The system of claim 11, wherein the response characterization component is configured to determine a matrix, J, representing surface unknowns comprising at least one of current densities and aperture fields at each of the plurality of discrete elements, from a combined impedance matrix, Z, representing the plurality of subdomains, and the excitation matrix, E.

14. The system of claim 13, wherein the synthetic function generator is configured to generate the set of synthetic basis functions for each subdomain to be used as a change of basis matrix determined for transforming a portion of the impedance matrix for the subdomain into a reduced matrix representing the subdomain.

15. The system of claim 14, wherein the response characterization component is configured to determine the matrix representing current density at each of the plurality of discrete elements by applying the change of basis matrix to the combined impedance matrix to provide a reduced matrix, Z', evaluating the relationship Z'J'=E to provide a matrix, J', representing the surface unknowns in a domain associated with the change of basis matrix, and applying a conjugate transpose of the change of basis matrix to the matrix representing the surface unknowns in a domain associated with the change of basis matrix to provide the matrix representing current density.

16. A method for modeling a radar cross section of a conductive assembly comprising:
dividing the conductive assembly into a plurality of subdomains, each subdomain representing a plurality of edges over a three-dimensional volume of the conductive assembly;
determining an impedance matrix for each subdomain;
compressing the impedance matrix via an adaptive cross-approximation algorithm that iteratively adds rows and columns to a matrix representing the impedance matrix until the sum of the values added to the matrix with the addition of a new row or column is a less than a threshold value;

generating a set of synthetic basis functions for each subdomain from its set of elemental basis functions, wherein a plural subset of the sets of synthetic basis functions are generated in parallel on the plurality of processing units; and determining the radar cross section of the conductive assembly from the sets of synthetic basis functions for each subdomain and an excitation matrix, representing simulated incident electrical and magnetic stimulation to the conductive assembly.

17. The method of claim 16, wherein determining the radar cross section of the conductive assembly from the sets of synthetic basis functions for each subdomain and the excitation matrix comprises determining a matrix representing current density from a combined impedance matrix representing the plurality of subdomains, the sets of synthetic basis functions, and the excitation matrix.

18. The method of claim 16, wherein generating the set of synthetic basis functions for each subdomain from its set of elemental basis functions comprises applying an eigendecomposition to the set of elemental basis functions.

\* \* \* \* \*